US012790478B2

(12) United States Patent
Matsumura et al.

(10) Patent No.: US 12,790,478 B2
(45) Date of Patent: Nov. 10, 2026

(54) CHLORINATED VINYL CHLORIDE RESIN COMPOSITION AND CHLORINATED VINYL CHLORIDE RESIN MOLDED BODY

(71) Applicant: SEKISUI CHEMICAL CO., LTD., Osaka (JP)

(72) Inventors: Kenichi Matsumura, Yamaguchi (JP); Hiroaki Mochizuki, Yamaguchi (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 541 days.

(21) Appl. No.: 18/281,880

(22) PCT Filed: Mar. 25, 2022

(86) PCT No.: PCT/JP2022/014443
§ 371 (c)(1),
(2) Date: Sep. 13, 2023

(87) PCT Pub. No.: WO2022/210365
PCT Pub. Date: Jun. 10, 2022

(65) Prior Publication Data
US 2024/0158625 A1 May 16, 2024

(30) Foreign Application Priority Data
Mar. 29, 2021 (JP) ................................ 2021-055434

(51) Int. Cl.
*C08L 27/24* (2006.01)
*C08K 5/098* (2006.01)
*C08K 5/58* (2006.01)
*C08L 23/286* (2025.01)
*C08L 27/06* (2006.01)

(52) U.S. Cl.
CPC .............. *C08L 27/24* (2013.01); *C08K 5/098* (2013.01); *C08K 5/58* (2013.01); *C08L 23/286* (2013.01); *C08L 27/06* (2013.01); *C08L 2201/08* (2013.01); *C08L 2203/30* (2013.01)

(58) Field of Classification Search
None
See application file for complete search history.

(56) References Cited

U.S. PATENT DOCUMENTS

| | | | | |
|---|---|---|---|---|
| 5,604,278 | A | 2/1997 | Hartitz | |
| 5,641,826 | A * | 6/1997 | Lawson | B29C 48/00 525/239 |
| 5,981,663 | A | 11/1999 | Backman et al. | |
| 2017/0183491 | A1 * | 6/2017 | Matsumura | C08K 5/1345 |
| 2022/0127390 | A1 | 4/2022 | Murakami et al. | |
| 2022/0282065 | A1 | 9/2022 | Matsumura | |

FOREIGN PATENT DOCUMENTS

| | | |
|---|---|---|
| JP | 6-228398 | 8/1994 |
| JP | 2002-226659 | 8/2002 |
| JP | 2006-199801 | 8/2006 |
| JP | 2009-83270 | 4/2009 |
| WO | 2020/203862 | 10/2020 |
| WO | 2021/039993 | 3/2021 |

OTHER PUBLICATIONS

Komoroski, et al., "$^{13}$C NMR Microstructural Analysis of Chlorinated Poly(vinyl chloride) in Terms of Three-Carbon Sequences", Macromolecules, 1985, vol. 1985, vol. 18, No. 6, pp. 1257-1265.
International Search Report issued May 24, 2022 in corresponding International (PCT) Patent Application No. PCT/JP2022/014443.

* cited by examiner

*Primary Examiner* — Sheeba Ahmed
(74) *Attorney, Agent, or Firm* — Wenderoth, Lind & Ponack, L.L.P.

(57) ABSTRACT

The present invention provides a chlorinated polyvinyl chloride resin composition that is excellent in low-volatility in molding, processability after molding, thermal stability, and heat resistance and that enables the production of a molded body with high surface smoothness, and also provides a chlorinated polyvinyl chloride resin molded body. Provided is a chlorinated polyvinyl chloride resin composition containing: a chlorinated polyvinyl chloride resin; chlorinated polyethylene; and a thermal stabilizer, the chlorinated polyvinyl chloride resin containing a vinylidene unit in an amount of 3 to 32% by mass, the chlorinated polyvinyl chloride resin composition having a mass ratio of the chlorinated polyethylene to the thermal stabilizer (chlorinated polyethylene/thermal stabilizer) of 1.0 to 7.0, the chlorinated polyvinyl chloride resin composition having a loss on heating at 200° C. of less than 3% by mass.

2 Claims, No Drawings

CHLORINATED VINYL CHLORIDE RESIN COMPOSITION AND CHLORINATED VINYL CHLORIDE RESIN MOLDED BODY

TECHNICAL FIELD

The present invention relates to a chlorinated polyvinyl chloride resin composition and a chlorinated polyvinyl chloride resin molded body.

BACKGROUND ART

Polyvinyl chloride resins (hereafter, referred to as PVCs) have excellent mechanical strength, weather resistance, and chemical resistance, and thus have been used in various fields. PVCs, however, have poor heat resistance. This has led to the development of chlorinated polyvinyl chloride resins (hereafter, referred to as CPVCs), which are PVCs chlorinated to have improved heat resistance. PVCs have a low heat distortion temperature and the upper limit of the usable temperature thereof is at around 60° C. to 70° C., which does not allow the use of PVCs with hot water. In contrast, CPVCs have a higher heat distortion temperature than PVCs by 20° C. to 40° C. and therefore are usable with hot water. CPVCs are suitably used in heat-resistant joints, heat-resistant pipes, heat-resistant valves, heat-resistant plates, or the like.

Addition of a thermal stabilizer to CPVC prior to melt-molding is a common technique for improving various performances such as thermal stability and discoloration resistance.

For example, Patent Literature 1 discloses a chlorinated polyvinyl chloride resin composition prepared by adding predetermined amounts of chlorinated polyethylene, an organotin thermal stabilizer, and an inorganic stabilizer to a chlorinated polyvinyl chloride resin for the purpose of imparting thermal stability, heat moldability, and like properties.

CITATION LIST

Patent Literature

Patent Literature 1: JP 2006-199801 A

SUMMARY OF INVENTION

Technical Problem

However, even the chlorinated polyvinyl chloride resin composition disclosed in Patent Literature 1 may generate volatiles due to pyrolysis or show a decrease in fluidity in molding.

Molded bodies such as solid round bar molded bodies (rod-shaped molded bodies), solid L-shaped flanges, and rectangular bars, among others, are cooled from the outside after molding, but their center portion is difficult to sufficiently cool due to low thermal conductivity. Such molded bodies thus have tendency to have voids inside. Thus, chlorinated polyvinyl chloride resin compositions used as raw materials of solid molded bodies require both thermal stability and fluidity at a higher level.

Solution to Problem

The present invention relates to a chlorinated polyvinyl chloride resin composition containing: a chlorinated polyvinyl chloride resin; chlorinated polyethylene; and a thermal stabilizer, the chlorinated polyvinyl chloride resin containing a vinylidene unit in an amount of 3 to 32% by mass, the chlorinated polyvinyl chloride resin composition having a mass ratio of the chlorinated polyethylene to the thermal stabilizer (chlorinated polyethylene/thermal stabilizer) of 1.0 to 7.0, the chlorinated polyvinyl chloride resin composition having a loss on heating at 200° C. of less than 3% by mass.

The present invention is described in detail below.

The present inventors have added chlorinated polyethylene and a thermal stabilizer to a chlorinated polyvinyl chloride resin and specified the amount of a vinylidene unit in the chlorinated polyvinyl chloride resin, the mass ratio of the chlorinated polyethylene to the thermal stabilizer, and the volatility loss at 200° C. The inventors have found out that this enables the production of a molded body with excellent thermal stability and heat resistance and high surface smoothness, and thus completed the present invention.

In particular, the present invention can significantly reduce generation of voids inside a molded body even when used for a rod-shaped molded body. Moreover, when used for a rod-shaped molded body, the present invention can provide a molded body with less residual strain after molding and with fewer cracks and chips in cutting during post-processing. Such excellent processability after molding enables processing of the composition into a wide range of shapes.

The chlorinated polyvinyl chloride resin composition of the present invention has a loss on heating at 200° C. of less than 3% by mass.

When the loss on heating at 200° C. is less than 3% by mass, generation of voids (bubbles) inside the molded body can be prevented. The loss on heating at 200° C. is more preferably less than 2% by mass. The lower limit of the loss on heating at 200° C. is not limited, but is preferably 0.01% by mass.

The loss on heating at 200° C. can be measured using a thermogravimetry (TG) device or the like.

The loss on heating at 200° C. can be set to a predetermined range by adjusting factors such as the structure of the chlorinated polyvinyl chloride resin and the type and amount of the thermal stabilizer added.

The chlorinated polyvinyl chloride resin composition of the present invention preferably has a heat distortion temperature (HDT) of 100° C. or higher as measured in conformity with ASTM D648. This can reduce thermal expansion and contraction. The preferable upper limit of the heat distortion temperature is not specified, but is preferably 150° C.

The lower limit of the fluidity at 160° C. of the chlorinated polyvinyl chloride resin composition of the present invention is preferably 1 $mm^3$/sec, and the upper limit thereof is preferably 100 $mm^3$/sec. When the fluidity is within the range, the moldability can be higher. The lower limit is more preferably 5 $mm^3$/sec, still more preferably 20 $mm^3$/sec, and the upper limit is more preferably 60 $mm^3$/sec.

The fluidity at 160° C. can be measured using a flow tester or the like.

The chlorinated polyvinyl chloride resin composition of the present invention contains a chlorinated polyvinyl chloride resin (hereinafter also referred to as a "CPVC").

The CPVC includes a vinylidene unit [structural unit (a) represented by the following formula (a)].

The vinylidene unit is an unstable structure formed during chlorination of a polyvinyl chloride resin. The presence of this structure lowers the thermal stability, deteriorating the moldability. Thus, when the amount of the vinylidene unit is within the range described above, the CPVC has high uniformity, leading to good thermal stability.

[Chem. 1]

$$—CCl_2— \quad (a)$$

The amount of the vinylidene unit is 3 to 32% by mass based on the CPVC. Such a CPVC has high thermal stability and good molding processability. The lower limit of the amount is preferably 4% by mass, and the upper limit thereof is preferably 30% by mass. The lower limit is more preferably 5% by mass, and the upper limit is more preferably 25% by mass. The lower limit is still more preferably 6% by mass, and the lower limit is further preferably 7% by mass.

The CPVC preferably includes a structural unit (b) represented by the following formula (b). The amount of the structural unit (b) is preferably 50 to 90% by mass based on the CPVC. The lower limit of the amount of the structural unit (b) is more preferably 60% by mass, and the upper limit thereof is more preferably 85% by mass.

When the amount of the structural unit (b) is within the range, the CPVC has high uniformity, leading to good thermal stability.

[Chem. 2]

$$—CHCl— \quad (b)$$

The CPVC preferably includes a different structural unit other than the vinylidene unit and the structural unit (b). The amount of the different structural unit is preferably 7 to 35% by mass based on the CPVC. The lower limit of the amount is more preferably 10% by mass, and the upper limit thereof is more preferably 30% by mass. The upper limit is still more preferably 28% by mass, further preferably 18% by mass, particularly preferably 15% by mass.

When the CPVC includes the different structural unit, the CPVC can have high uniformity, leading to good thermal stability.

Examples of the different structural unit include a methylene unit ($—CH_2—$), a unit having a double bond ($—CH=$), and a unit having a branched structure [$—CH(CH_2Cl)—$].

The amounts of the vinylidene unit, the structural unit (b), and the different structural unit in the CPVC can be measured by the following method.

The amounts (mol %) of the structural units are measured by molecular structure analysis using NMR. The amounts of the vinylidene unit, the structural unit (b), and the different structural unit are then calculated by multiplying the mol % of each structural unit by its molecular weight and dividing the product by the total amount of all the structural units (vinylidene unit (mol %)×molecular weight of vinylidene unit+structural unit (b)×molecular weight of structural unit (b)+different structural unit×molecular weight of $CH_2$). For the different structural unit, the molecular weight of $—CH_2—$, a main component, can be used for the calculation.

The NMR analysis can be performed in conformity with the method described in R. A. Komoroski, R. G. Parker, J. P. Shocker, Macromolecules, 1985, 18, 1257-1265.

In the chlorinated polyvinyl chloride resin, the amount of added chlorine is preferably 1 to 15% by mass.

When the amount of added chlorine is 1% by mass or more, the molded body has sufficient heat distortion resistance. When the amount of added chlorine is 15% by mass or less, the moldability is improved.

The amount of added chlorine is more preferably 3% by mass or more, and more preferably 13% by mass or less.

To determine the amount of added chlorine in the chlorinated polyvinyl chloride resin, the chlorine content of the resin is first measured by the method specified in JIS K 7229. The obtained chlorine content is subtracted from the chlorine content (56.8% by mass) of a polyvinyl chloride resin, thereby determining the amount of added chlorine.

The degree of polymerization of the chlorinated polyvinyl chloride resin is not limited, and is preferably 400 to 2,000, more preferably 500 to 1,100.

When the degree of polymerization is within the above range, the fluidity in molding and the strength of the molded body can be both achieved. The degree of polymerization can be measured by a method in conformity with JIS K 6720-2:1999, for example.

The chlorinated polyvinyl chloride resin may be produced by, for example, a method including preparing a suspension in a reaction vessel by suspending a polyvinyl chloride resin in an aqueous medium, introducing chlorine into the reaction vessel, and heating the suspension to chlorinate the polyvinyl chloride resin.

The reaction vessel used may be a commonly used vessel such as a glass-lined stainless steel reaction vessel or titanium reaction vessel, for example.

The method of preparing the suspension of the polyvinyl chloride resin in an aqueous medium is not limited. For example, a cake-like PVC obtained by subjecting a polymerized PVC to monomer removal treatment may be used, or a dried PVC may be resuspended in an aqueous medium, or a suspension obtained by removing any substance undesired for the chlorination reaction from the polymerization system may be used. It is preferred to use a cake-like resin obtained by subjecting a polymerized PVC to monomer removal treatment.

The aqueous medium used may be ion-exchange-treated pure water, for example. While the amount of the aqueous medium is not limited, generally, it is preferably 150 to 400 parts by mass based on 100 parts by mass of the PVC.

Chlorine to be introduced into the reaction vessel may be either liquid chlorine or gaseous chlorine. The use of liquid chlorine is efficient in that a large amount of chlorine can be charged into the reaction vessel in a short period of time. Chlorine may be added in the course of reaction to adjust the pressure or supply chlorine. At this time, gaseous chlorine in addition to liquid chlorine may be blown into the reaction vessel, as required. It is preferred to use chlorine after purging 5 to 10% by mass of chlorine from the cylinder.

While the gauge pressure in the reaction vessel is not limited, it is preferably from 0 to 2 MPa, because the higher the chlorine pressure is, the more readily the chlorine will penetrate into the PVC particles.

The method of chlorinating the PVC in the suspended state is not limited. Examples of the chlorination method include a method in which the excitation of bonding of the PVC and chlorine is brought about by thermal energy to accelerate the chlorination (hereinafter referred to as thermal chlorination); and a method in which light energy such as ultraviolet light or light from an LED is applied to accelerate the chlorination by photoreaction (hereinafter referred to as photo-chlorination). The heating method in the chlorination by thermal energy is not limited, and for example, heating with an external jacket from the reactor wall is effective. The use of light energy such as ultraviolet light requires an apparatus capable of light energy irradiation such as ultraviolet irradiation under high temperature and high pressure conditions. In the photo-chlorination, the chlorination reaction temperature is preferably 40° C. to 80° C. In the photo-chlorination, the ratio of the light energy irradiation intensity (W) to the total amount (kg) of the raw material PVC and water is preferably 0.001 to 6 (W/kg). The irradiation light preferably has a wavelength of 280 to 420 nm.

Preferred among the above chlorination methods is a thermal chlorination method involving no ultraviolet irradiation. Preferred is a method in which the excitation of bonding of the polyvinyl chloride resin and chlorine is brought about by heat alone or by heat and hydrogen peroxide to accelerate the chlorination reaction.

In the case of the chlorination reaction by light energy, the amount of light energy needed to chlorinate the PVC is greatly affected by the distance between the PVC and the light source. Thus, the amount of received energy is different inside and on the surface of the PVC particles, so that chlorination does not occur uniformly. As a result, a CPVC with reduced uniformity is obtained. In contrast, with the method of chlorination by heat without ultraviolet irradiation, a more uniform chlorination reaction occurs to produce a CPVC with increased uniformity.

The chlorination by heat alone is preferably performed at a temperature of 40° C. to 120° C. When the temperature is excessively low, the rate of chlorination will decrease. When the temperature is excessively high, dehydrochlorination reaction will occur along with the chlorination reaction, which causes discoloration of the resulting CPVC. The heating temperature is more preferably 50° C. to 110° C. The heating method is not limited, and heating may be performed with an external jacket from the reaction vessel wall, for example.

In the chlorinated polyvinyl chloride resin composition of the present invention, the amount of the CPVC is preferably 65 to 96% by mass, more preferably 70 to 93% by mass. Containing the CPVC within this range, the chlorinated polyvinyl chloride resin composition of the present invention can provide a molded body having both heat distortion resistance and impact resistance and being excellent in surface smoothness.

The chlorinated polyvinyl chloride resin composition of the present invention contains chlorinated polyethylene.

Containing the chlorinated polyethylene, the chlorinated polyvinyl chloride resin composition enables the production of a molded body with high surface smoothness.

The chlorinated polyethylene may be any polyethylene in which a hydrogen atom bonded to a polyethylene main chain has been replaced with a chlorine atom. The chlorinated polyethylene may be one obtained by chlorinating an ethylene (co)polymer, for example.

Amorphous chlorinated polyethylene, semi-crystalline chlorinated polyethylene, and/or the like may be used as the chlorinated polyethylene. These may be used alone or in combination of two or more thereof.

The chlorinated polyethylene may have any chlorine content. The chlorine content is preferably 15 to 45% by mass. When the chlorine content is within the range, the chlorinated polyethylene can have a good dispersed state in the CPVC, allowing the production of a molded body with high surface smoothness.

The lower limit of the chlorine content is more preferably 30% by mass, and the upper limit thereof is more preferably 40% by mass.

The chlorine content refers to the proportion by mass of chlorine atoms to the whole amount of the chlorinated polyethylene and can be quantified by potentiometric titration specified in JIS K 7229.

The amount of a —CHCl— component in the total amount of the chlorinated polyvinyl chloride resin and the chlorinated polyethylene is preferably 30 to 80% by mass, more preferably 50 to 77% by mass. The amount of the —CHCl— component can be measured in the same manner as for the amounts of the vinylidene unit, the structural unit (b), and the different structural unit in the CPVC.

The chlorinated polyethylene preferably has a density of 1.05 to 1.3 g/cm$^3$. When the density is within the range, the chlorinated polyethylene can have a good dispersed state in the CPVC, allowing the production of a molded body with high surface smoothness.

The lower limit of the density is more preferably 1.10 g/cm$^3$, and the upper limit thereof is more preferably 1.25 g/cm$^3$.

The density can be measured by JIS K 7112 "Plastics-Methods of determining the density and relative density of non-cellular plastics".

The chlorinated polyethylene may have any Mooney viscosity ML1+4 (121° C.). The Mooney viscosity ML1+4 (121° C.) is preferably 50 to 120, more preferably 55 to 95.

The Mooney viscosity is measured by a method specified in JIS K 6300 and is used as an index of viscosity. In "ML1+4", "M" denotes Mooney, "L" denotes the rotor shape, and "(1+4)" denotes one minute of preheating and four minutes of rotating the rotor. The (121° C.) means that the Mooney viscosity is measured at 121° C.

The chlorinated polyvinyl chloride resin composition preferably contains 3 to 20 parts by mass of the chlorinated polyethylene based on 100 parts by mass of the chlorinated polyvinyl chloride resin. When the amount of the chlorinated polyethylene is within the range, the chlorinated polyethylene can have a good dispersed state in the CPVC, allowing the production of a molded body with excellent surface smoothness. The lower limit of the amount is more preferably 5 parts by mass, and the upper limit thereof is more preferably 15 parts by mass.

The amount (% by mass) of the chlorinated polyethylene based on the whole chlorinated polyvinyl chloride resin composition is preferably 2 to 16% by mass.

In the chlorinated polyvinyl chloride resin composition of the present invention, the lower limit of the total of the amount (% by mass) of the chlorinated polyethylene and the amount (% by mass) of the vinylidene unit of the chlorinated polyvinyl chloride resin is preferably 5% by mass, and the upper limit thereof is preferably 42% by mass, based on the whole composition. When the total is within the range, the thermal stability can be maintained while good appearance of the resulting molded body can be kept. The lower limit of the total is more preferably 7% by mass, and the upper limit thereof is more preferably 35% by mass. The lower limit is still more preferably 9% by mass, and the upper limit is still more preferably 30% by mass.

The chlorinated polyvinyl chloride resin composition of the present invention contains a thermal stabilizer.

In the present invention, the thermal stabilizer preferably contains a primary stabilizer and a co-stabilizer. The use of the primary stabilizer and the co-stabilizer in combination can further improve the thermal stability.

The primary stabilizer contains at least one metal selected from the group consisting of tin, lead, calcium, and zinc. The co-stabilizer does not contain the metals.

Examples of the primary stabilizer include an organotin stabilizer, a stabilizer containing a calcium alkyl carboxylate and a zinc compound, and a lead stabilizer. Zeolite is not a primary stabilizer but is a co-stabilizer.

Examples of the organotin stabilizer include alkyltins (e.g., methyltin, butyltin, octyltin), preferably dialkyltin salts of aliphatic monocarboxylic acids such as lauric acid or of dicarboxylic acids such as maleic acid and phthalic acid. Specific examples thereof include dibutyltin dilaurate, dioctyltin laurate, dibutyltin maleate, dibutyltin phthalate, dimethyltin bis(2-ethylhexylthioglycolate), and alkyltin mercaptides such as dibutyltin mercaptide and dimethyltin mercaptide. Preferred among these are butyltin mercaptan compounds such as dibutyltin mercaptide.

Examples of the calcium alkylcarboxylate include calcium salts of pentanoic acid, hexanoic acid, heptanoic acid, octanoic acid, cyclohexylpropionic acid, nonanoic acid, decanoic acid, lauric acid, myristic acid, palmitic acid, stearic acid, 12-hydroxystearic acid, arachidic acid, behenic acid, lignoceric acid, montanic acid, or the like. Preferred among these is a C8-C28 calcium alkylcarboxylate.

Examples of the zinc compound include an inorganic zinc compound and an organic zinc compound. Examples of the inorganic zinc compound include compounds in the system of zinc carbonate, zinc chloride, zinc sulfate, zinc oxide, zinc hydroxide, basic zinc oxide, and mixed zinc oxide.

Examples of the lead stabilizer include tribasic lead sulfate, tribasic lead sulfite, dibasic lead phosphite, lead stearate, and dibasic lead stearate.

The amount of the primary stabilizer in the chlorinated polyvinyl chloride resin composition of the present invention is preferably 0.3 to 10 parts by mass, more preferably 0.5 to 7 parts by mass, still more preferably 0.6 to 4 parts by mass based on 100 parts by mass of the chlorinated polyvinyl chloride resin. When the primary stabilizer is contained within the range, the thermal stability can be further improved while good appearance of the molded body can be maintained.

The co-stabilizer preferably contains no water of crystallization inside.

Specific examples of the co-stabilizer include organic acid salts, epoxy compounds, phosphoric acid compounds, sodium adipate, glycidyl (meth)acrylate copolymers, oxetanyl compounds, vinyl ether compounds, and zeolite compounds. Preferred among these are organic acid salts, epoxy compounds, phosphoric acid compounds, sodium adipate, glycidyl (meth)acrylate copolymers, oxetanyl compounds, and vinyl ether compounds.

Examples of the epoxy compounds include epoxidized soybean oil, epoxidized linseed oil, epoxidized tetrahydrophthalate, epoxidized polybutadiene, and bisphenol A epoxy compounds.

Examples of the phosphoric acid compounds include organophosphorus compounds, phosphorous acid esters, and phosphoric acid esters.

Examples of the metal hydroxide include sodium hydroxide.

A phenolic compound, an amine compound, and/or the like may be used.

These may be used alone or in combination of two or more thereof. Here, the co-stabilizer is different from the thermal stabilizer.

The co-stabilizer preferably has a loss on heating at 200° C. of less than 3% by mass.

The amount of the co-stabilizer in the chlorinated polyvinyl chloride resin composition of the present invention is preferably 0 to 10 parts by mass, more preferably 0.1 to 5 parts by mass based on 100 parts by mass of the chlorinated polyvinyl chloride resin. When the co-stabilizer is contained within the range, the thermal stability can be further improved while good appearance of the molded body can be maintained.

The thermal stabilizer preferably has a loss on heating at 200° C. of less than 3% by mass.

When the loss on heating at 200° C. is less than 3% by mass, it is possible to prevent the resulting molded body from containing bubbles therein that cause insufficient strength or from having a streak-like pattern at around the surface that causes a defective appearance.

The loss on heating at 200° C. is more preferably less than 2% by mass.

In the chlorinated polyvinyl chloride resin composition of the present invention, the amount of the thermal stabilizer (total amount of all thermal stabilizers) is preferably 0.3 to 20 parts by mass, more preferably 0.6 to 12 parts by mass based on 100 parts by mass of the chlorinated polyvinyl chloride resin. When the thermal stabilizer is contained within the range, the thermal stability can be further improved while good appearance of the molded body can be maintained.

The chlorinated polyvinyl chloride resin composition of the present invention preferably has a mass ratio of the co-stabilizer to the primary stabilizer (amount of co-stabilizer/amount of primary stabilizer) of 0 to 30. The mass ratio of the co-stabilizer to the primary stabilizer is more preferably 0.1 to 20, still more preferably 0.2 to 10, further preferably 0.4 to 3.2. When the mass ratio is within the range, both fluidity and thermal stability can be achieved.

The chlorinated polyvinyl chloride resin composition of the present invention has a mass ratio of the chlorinated polyethylene to the thermal stabilizer (all thermal stabilizers) (amount of chlorinated polyethylene/amount of thermal stabilizer) of 1.0 to 7.0. The mass ratio of the thermal stabilizer to the chlorinated polyethylene is preferably 1.6 to 6.5, more preferably 2.3 to 6.0. When the mass ratio is within the range, both fluidity and thermal stability can be achieved.

The lower limit of the mass ratio is still more preferably 2.4, particularly preferably 2.6.

The chlorinated polyvinyl chloride resin composition of the present invention may contain an existing known polyvinyl chloride resin. The use of the polyvinyl chloride resin and the chlorinated polyvinyl chloride resin in combination can impart sufficient thermal stability, and such a chlorinated polyvinyl chloride resin composition is suitably usable in a variety of molding methods.

The polyvinyl chloride resin used may be a vinyl chloride homopolymer, or may be a copolymer of a vinyl chloride monomer and a monomer with unsaturated bond(s) that is copolymerizable with the vinyl chloride monomer, a graft copolymer obtained by graft-copolymerizing a vinyl chloride monomer to a polymer, or the like. These polymers may be used alone or in combination of two or more thereof.

Examples of the monomer with unsaturated bond(s) that is copolymerizable with the vinyl chloride monomer include α-olefins, vinyl esters, vinyl ethers, (meth)acrylates, aromatic vinyls, vinyl halides, and N-substituted maleimides. These monomers may be used alone or in combination of two or more thereof.

Examples of the α-olefins include ethylene, propylene, and butylene. Examples of the vinyl esters include vinyl acetate and vinyl propionate. Examples of the vinyl ethers include butyl vinyl ether and cetyl vinyl ether.

Examples of the (meth)acrylates include methyl (meth) acrylate, ethyl (meth)acrylate, butyl acrylate, and phenyl methacrylate. Examples of the aromatic vinyls include styrene and α-methyl styrene.

Examples of the vinyl halides include vinylidene chloride and vinylidene fluoride. Examples of the N-substituted maleimides include N-phenyl maleimide and N-cyclohexyl maleimide.

Preferred among these are ethylene and vinyl acetate.

The polymer to which vinyl chloride is graft-copolymerized is not limited as long as vinyl chloride can be graft-copolymerized. Examples of such a polymer include an ethylene-vinyl acetate copolymer, an ethylene-vinyl acetate-carbon monoxide copolymer, an ethylene-ethyl acrylate copolymer, an ethylene-butyl acrylate-carbon monoxide copolymer, an ethylene-methyl methacrylate copolymer, and an ethylene-propylene copolymer. Examples also include an acrylonitrile-butadiene copolymer, polyurethane, chlorinated polyethylene, and chlorinated polypropylene. These may be used alone or in combination of two or more thereof.

The method of polymerizing the PVC is not limited, and a conventionally known method such as aqueous suspension polymerization, bulk polymerization, solution polymerization, or emulsion polymerization can be used.

The polyvinyl chloride resin has a chlorine content of less than 56.8% by mass.

When the chlorine content is within the above range, the chlorinated polyvinyl chloride resin composition has better moldability and the resulting molded body has higher heat distortion resistance. The chlorine content is preferably 36.8 to 56.7% by mass.

The chlorinated polyvinyl chloride resin composition of the present invention preferably contains an impact resistance modifier.

The impact resistance modifier is used for the purpose of improving the impact resistance of the resulting molded body. The impact resistance modifier preferably contains a diene rubber component.

The diene rubber component may be a homopolymer or a copolymer (including a binary copolymer and a ternary copolymer). Specifically, a copolymer containing a diene component as a copolymer component is referred to as a diene rubber component. The copolymerization method employed may be any of random copolymerization, alternating copolymerization, block copolymerization, and graft copolymerization.

Examples of the diene component include butadiene, isoprene, and chloroprene.

Examples of the diene rubber component include a copolymer containing a monomer component selected from the group consisting of unsaturated nitriles, α-olefins, and aromatic vinyls. Examples further include a copolymer of an unsaturated nitrile and a diene component, a copolymer of an aromatic vinyl and a diene component, a copolymer of an olefin and a diene component, and a copolymer of a (meth) acrylate monomer component and a diene component.

More specific examples of the diene rubber component include an acrylonitrile-butadiene copolymer, a butadiene-styrene copolymer, a styrene-isoprene copolymer, and an ethylene-propylene-diene copolymer. The diene rubber component used is preferably a methyl methacrylate-butadiene-styrene copolymer (MBS), an acrylonitrile-butadiene-styrene copolymer (ABS), a methyl methacrylate-acrylonitrile-butadiene-styrene copolymer (MABS), a methyl methacrylate-butadiene copolymer (MB), or the like.

The diene rubber component used is preferably a methyl methacrylate-acrylate butadiene rubber copolymer or a methyl methacrylate-acrylate butadiene rubber-styrene copolymer. Among these, preferred is/are a methyl methacrylate-butadiene-styrene copolymer and/or an acrylonitrile-butadiene-styrene copolymer.

In the case where the diene rubber component is a diene component-containing copolymer, the amount of the diene component is preferably 30 to 90% by mass, more preferably 40 to 85% by mass, still more preferably 50 to 80% by mass.

In the case where the diene rubber component is a copolymer of an acrylic component and a diene component, the ratio of the acrylic component to the diene component (acrylic component/diene component) is within a range of preferably 0.05 to 3.0, more preferably 0.1 to 2.5, still more preferably 0.1 to 2.0.

The impact resistance modifier may contain a non-diene component.

Examples of the non-diene component include a polymer containing one or more monomer components selected from the group consisting of olefins and organosiloxanes. More specific examples thereof include olefin rubbers (e.g., ethylene-propylene rubber) and silicone acrylic rubbers.

Examples of the non-diene component include a (meth) acrylate monomer component.

Examples of the (meth)acrylate monomer component include C1-C12 alkyl (meth)acrylates, such as methyl (meth)acrylate, ethyl (meth)acrylate, propyl (meth)acrylate, butyl (meth)acrylate, 2-ethyl (meth)acrylate, and 2-ethylhexyl methacrylate. These monomer components may be used alone or in combination of two or more thereof (e.g., three monomer components). Examples further include a methyl methacrylate-(acrylic silicone complex) copolymer.

The amount of the (meth)acrylate monomer component in the polymer constituting the diene rubber particles is not limited, and is preferably 25% by mass or more, for example.

The impact resistance modifier is preferably in the form of particles, which can improve the dispersibility of the impact resistance modifier in the chlorinated polyvinyl chloride resin composition containing CPVC.

The lower limit of the average particle size of the impact resistance modifier is preferably 0.001 μm, and the upper limit thereof is preferably 1.0 μm. When the average particle size is within the above range, the transparency and the impact resistance can be both achieved. The average particle size can be measured using a laser diffraction particle size distribution analyzer.

The lower limit of the specific gravity of the impact resistance modifier is preferably 0.92 $g/cm^3$ and the upper limit thereof is preferably 1.16 $g/cm^3$. When the specific gravity is within the above range, the particles of the impact resistance modifier can improve the impact resistance without impairing the transparency of the resulting molded body. The specific gravity can be measured, for example, with a dry automatic pycnometer (Accupyc II1340, available from Shimadzu Corporation).

In the chlorinated polyvinyl chloride resin composition of the present invention, the amount of the impact resistance modifier is preferably 1.0 to 20 parts by mass based on 100 parts by mass of the chlorinated polyvinyl chloride resin. The chlorinated polyvinyl chloride resin composition containing the impact resistance modifier within this range can provide a molded body having still higher impact resistance.

The lower limit of the amount of the impact resistance modifier is more preferably 3.0 parts by mass, and the upper limit thereof is more preferably 18.0 parts by mass.

The chlorinated polyvinyl chloride resin composition of the present invention preferably further contains an antioxidant.

The antioxidant used may be, for example, a phenolic antioxidant, a phosphoric acid antioxidant, a sulfur antioxidant, or an amine antioxidant. These antioxidants may be used alone or in combination of two or more thereof. Among these, preferred is a phenolic antioxidant and particularly preferred is a hindered phenol antioxidant.

Examples of the hindered phenol antioxidant include 2,6-di-t-butyl-p-cresol, 2,6-diphenyl-4-octadecyloxyphenol, stearyl(3,5-t-butyl-4-hydroxyphenyl)propionate, distearyl (3,5-t-butyl-4-hydroxybenzyl)phosphonate, 2,2'-methylenebis(4-methyl-6-t-butylphenol), 2,2'-methylenebis(4-ethyl-6-t-butylphenol), bis[3,3-bis(4-hydroxy-3-t-butylphenyl) butyric acid] glycol ester, 4,4'-butylidenebis(6-t-butyl-m-cresol), 2,2'-ethylidenebis(4,6-di-t-butylphenol), 2,2'-ethylidenebis(4-sec-butyl-6-t-butylphenol), 1,1,3-tris(2-methyl-4-hydroxy-5-t-butylphenyl)butane, bis[2-t-butyl-4-methyl-6-(2-hydroxy-3-t-butyl-5-methylbenzyl)phenyl] terephthalate, 1,3,5-tris(2,6-dimethyl-3-hydroxy-4-t-butylbenzyl)isocyanurate, 1,3,5-tris(3,5-di-t-butyl-4-hydroxybenzyl)isocyanurate, 1,3,5-tris(3,5-di-t-butyl-4-hydroxybenzyl)-2,4,6-trimethylbenzene, 1,3,5-tris[(3,5-di-t-butyl-4-hydroxyphenyl)propionyloxyethyl]isocyanurate, pentaerythrityl-tetrakis[methylene-3-(3,5-di-t-butyl-4-hydroxyphenyl)propionate], 2-t-butyl-4-methyl-6-(2'-acryloyloxy-3'-t-butyl-5'-methylbenzyl)phenol, 3,9-bis(1',1'-dimethyl-2'-hydroxyethyl)-2,4,8,10-tetraoxaspiro[5,5] undecane, and bis[β-(3-t-butyl-4-hydroxy-5-methylphenyl) propionate]. Among these, preferred are 1,3,5-tris(3,5-di-t-butyl-4-hydroxybenzyl)isocyanurate and pentaerythrityl-tetrakis[methylene-3-(3,5-di-t-butyl-4-hydroxyphenyl) propionate]. These may be used alone or in combination of two or more thereof.

The antioxidant preferably has a loss on heating at 200° C. of less than 3% by mass.

When the loss on heating at 200° C. is less than 3% by mass, it is possible to prevent the resulting molded body from containing bubbles therein that cause insufficient strength or from having a streak-like pattern at around the surface that causes a defective appearance.

The loss on heating at 200° C. is more preferably less than 3% by mass.

In the chlorinated polyvinyl chloride resin composition of the present invention, the amount of the antioxidant is preferably 0.1 to 3 parts by mass, more preferably 0.2 to 2.5 parts by mass based on 100 parts by mass of the chlorinated polyvinyl chloride resin. Containing the antioxidant within this range, the chlorinated polyvinyl chloride resin composition can provide a molded body less susceptible to discoloration due to yellowing.

The chlorinated polyvinyl chloride resin composition of the present invention preferably contains a lubricant.

Examples of the lubricant include internal lubricants and external lubricants. Internal lubricants are used to reduce the fluid viscosity of molten resin in molding to prevent the generation of frictional heat. External lubricants are used to improve the slip effect between metal surfaces and molten resin in molding.

The lubricant is not limited, and examples thereof include paraffin waxes, aliphatic hydrocarbon lubricants, polyolefin waxes, higher aliphatic alcohol lubricants, higher fatty acid lubricants, fatty acid ester lubricants, fatty acid amide lubricants, silicon resin lubricants, fluororesin lubricants, silicone oil, phosphoric acid alcohol esters, and carnauba wax.

Examples of the paraffin waxes include liquid paraffin containing 16 or more carbon atoms and partial oxides thereof, and native/synthetic paraffins.

Examples of the polyolefin waxes include polyethylene wax, polyethylene oxide wax, and polypropylene wax.

Examples of the higher aliphatic alcohols include lauryl alcohol and stearyl alcohol.

The higher fatty acid lubricants are preferably higher fatty acids containing 16 or more carbon atoms, and examples thereof include stearic acid and montanic acid. Examples further include purified substances of plant oils such as coconut oil, soybean oil, and rapeseed oil. Partially saponified esters of higher fatty acids (e.g., stearic acid, montanic acid) are also suitably usable.

Examples of the fatty acid ester lubricants include 2,3-dihydroxypropyl octadecanoate, butyl stearate, glycerol monostearate, pentaerythritol fatty acid esters such as pentaerythritol tetrastearate, and dipentaerythritol fatty acid esters.

These may be used alone or in combination of two or more thereof.

In the chlorinated polyvinyl chloride resin composition of the present invention, the amount of the lubricant is preferably 0.3 to 5.0 parts by mass based on 100 parts by mass of the chlorinated polyvinyl chloride resin. Containing the lubricant within this range, the chlorinated polyvinyl chloride resin composition is not likely to have scorch marks or foam in molding to provide a molded body excellent in surface smoothness.

The chlorinated polyvinyl chloride resin composition of the present invention may optionally contain additives such as processing aids, heat resistance improvers, ultraviolet absorbers, light stabilizers, fillers, thermoplastic elastomers, and pigments.

Examples of the heat resistance improvers include, but are not limited to, α-methylstyrene resins and N-phenylmaleimide resins.

Examples of the light stabilizers include, but are not limited to, hindered amine light stabilizers.

The processing aid preferably contains an acrylic resin having a weight average molecular weight of 50,000 to 10,000,000.

Examples of the acrylic resin include homopolymers of acrylic acid, methacrylic acid, and (meth)acrylic acid esters, and (meth)acrylic copolymers containing these.

Examples of the (meth)acrylic acid esters include methyl (meth)acrylate, ethyl (meth)acrylate, isopropyl (meth)acrylate, n-butyl (meth)acrylate, and isobutyl (meth)acrylate. Examples of the (meth)acrylic acid esters also include n-amyl (meth)acrylate, isoamyl (meth)acrylate, n-hexyl (meth)acrylate, 2-ethylhexyl (meth)acrylate, and n-octyl (meth)acrylate. Here, the term "(meth)acrylic acid" refers to acrylic acid or methacrylic acid. In the present invention, the acrylic processing aid used is preferably a polymer of methyl (meth)acrylate (MMA).

Examples of the ultraviolet absorbers include, but are not limited to, salicylate ultraviolet absorbers, benzophenone ultraviolet absorbers, benzotriazole ultraviolet absorbers, and cyanoacrylate ultraviolet absorbers.

Examples of the pigments include, but are not limited to, organic pigments such as azo pigments, phthalocyanine pigments, threne pigments, and dye lake pigments; and inorganic pigments such as oxide pigments (e.g., titanium dioxide), sulfide/selenide pigments, and ferrocyanide pigments.

The chlorinated polyvinyl chloride resin composition of the present invention may contain a plasticizer for the purpose of improving processability in molding. However, since a plasticizer may lower the thermal stability of a resulting molded body, the use of a plasticizer in a large amount is not so preferred. Examples of the plasticizer include, but are not limited to, dibutyl phthalate, di-2-ethylhexyl phthalate, and di-2-ethylhexyl adipate.

The chlorinated polyvinyl chloride resin composition of the present invention may contain a thermoplastic elastomer for the purpose of improving workability. Examples of the thermoplastic elastomer include nitrile thermoplastic elastomers, olefin thermoplastic elastomers, vinyl chloride thermoplastic elastomers, styrene thermoplastic elastomers, urethane thermoplastic elastomers, polyester thermoplastic elastomers, and polyamide thermoplastic elastomers.

Examples of the nitrile thermoplastic elastomers include an acrylonitrile-butadiene copolymer (NBR).

Examples of the olefin thermoplastic elastomers include ethylene thermoplastic elastomers such as an ethylene-vinyl acetate copolymer (EVA) and an ethylene-vinyl acetate-carbon monoxide copolymer (EVACO).

Examples of the vinyl chloride thermoplastic elastomers include a vinyl chloride-vinyl acetate copolymer and a vinyl chloride-vinylidene chloride copolymer.

These thermoplastic elastomers may be used alone or in combination of two or more thereof.

The chlorinated polyvinyl chloride resin composition of the present invention is produced, for example, by a method including mixing the chlorinated polyvinyl chloride resin with a predetermined thermal stabilizer and predetermined chlorinated polyethylene and optionally adding additives such as antioxidants, diene rubber particles, and lubricants.

The antioxidants, diene rubber particles, and lubricants may be blended by any method such as hot blending or cold blending.

The present invention also encompasses a chlorinated polyvinyl chloride resin molded body containing the chlorinated polyvinyl chloride resin composition of the present invention.

The chlorinated polyvinyl chloride resin molded body of the present invention may be produced by any conventionally known molding method such as extrusion molding or injection molding.

The chlorinated polyvinyl chloride resin molded body is suitably usable in applications such as plumbing materials and equipment, building components, and housing materials. It is also suitably usable for parts used in aircraft, vehicles, transport vehicles, and the like.

The chlorinated polyvinyl chloride resin molded body is especially suitably usable for molded bodies such as solid L-shaped flanges, solid rectangular bars, and solid round bars. Especially when used for a rod-shaped molded body, the chlorinated polyvinyl chloride resin molded body can significantly reduce generation of voids inside the molded body and the resulting molded body can have less residual strain after molding and fewer cracks and chips in cutting during post-processing.

The chlorinated polyvinyl chloride resin molded body is also usable for pipes and joints, such as liquid transport pipes and joints thereof for various applications including water/hot water supply, underfloor heating, hot water heating, hot spring piping, chemical spraying, drainage, water spraying, washing machines, dishwashers, toilets, bathrooms, solar systems, mist generators, and farming.

Advantageous Effects of Invention

The present invention can provide a chlorinated polyvinyl chloride resin composition that is excellent in low-volatility in molding, processability after molding, thermal stability, and heat resistance and that enables the production of a molded body with high surface smoothness, and can also provide a chlorinated polyvinyl chloride resin molded body.

DESCRIPTION OF EMBODIMENTS

The present invention is more specifically described in the following with reference to, but not limited to, examples.

Example 1

(Preparation of Chlorinated Polyvinyl Chloride Resin Composition)

To 100 parts by mass of a chlorinated polyvinyl chloride resin [degree of chlorination: 67.0% by mass, amount of added chlorine: 10.2% by mass, degree of polymerization: 1,000] were added 1.5 parts by mass of the butyltin mercaptan compound below as a thermal stabilizer (primary stabilizer) and 1.6 parts by mass of the sodium adipate below as a thermal stabilizer (co-stabilizer).

Further, 10 parts by mass of chlorinated polyethylene (chlorine content 34% by mass, density 1.19 g/cm$^3$, Mooney viscosity 81), 1.0 parts by mass of the polyethylene wax below as a lubricant, and 0.5 parts by mass of the partly saponified montanic acid ester below were added and mixed uniformly using a super mixer, whereby a chlorinated polyvinyl chloride resin composition was obtained.

Butyltin mercaptan compound (available from Nitto Kasei Co., Ltd., TVS*1380, dibutyltin mercaptide)

Sodium adipate (available from Tokyo Chemical Industry Co., Ltd.)

Polyethylene wax (available from Mitsui Chemicals, Inc., Hi-WAX 220MP)

Partly saponified montanic acid ester (available from Clariant (Japan) K.K., Licowax OP)

The obtained chlorinated polyvinyl chloride resin was subjected to measurement of the amounts (% by mass) of the vinylidene unit, the structural unit (b), and the different structural unit using FT-NMRJEOLJNM-AL-300. The NMR analysis can be performed by the method described in R. A. Komoroski, R. G. Parker, J. P. Shocker, Macromolecules, 1985, 18, 1257-1265.

(Preparation of Chlorinated Polyvinyl Chloride Resin Molded Body)

The obtained chlorinated polyvinyl chloride resin composition was supplied to a 65-mm single-screw extruder (available from Ikegai Corporation, FS65) equipped with a mold for a solid molded body. The composition was molded at a resin temperature of 165° C. and an extrusion amount of 15 kg/hr into a solid, rectangular plate-shaped chlorinated polyvinyl chloride resin molded body with a width of 45 mm and a height of 15 mm.

Examples 2 to 11 and Comparative Examples 1 to 3 and 6 to 8

A chlorinated polyvinyl chloride resin composition and a chlorinated polyvinyl chloride resin molded body were prepared as in Example 1 except that the type of the chlorinated polyvinyl chloride resin (molecular structure and amount of added chlorine), the amount of chlorinated polyethylene added, and the amounts of thermal stabilizers (primary stabilizer and co-stabilizer) added were as shown in Table 1.

Comparative Examples 4 and 5

A chlorinated polyvinyl chloride resin composition and a chlorinated polyvinyl chloride resin molded body were prepared as in Example 1 except that instead of sodium adipate, zeolite (available from Mizusawa Industrial Chemicals, Ltd., Mizukalizer SAP) in an amount shown in Table 1 was added as a thermal stabilizer (co-stabilizer).

<Evaluation>

The chlorinated polyvinyl chloride resin compositions and chlorinated polyvinyl chloride resin molded bodies obtained in the examples and the comparative examples were evaluated as follows. Table 1 shows the results.

[Evaluation of Composition]

<Loss on Heating>

The loss on heating of the obtained chlorinated polyvinyl chloride resin composition was measured with a thermogravimetry (TG) device (available from Seiko Instruments Inc., TG/DTA6200). The measurement was performed from 30 to 300° C. at a rate of temperature rise of 5° C./min.

Based on the measurement results, the loss on heating at 200° C. was determined by substituting the values in the following formula.

Loss on heating (% by mass)=(Mass before measurement−Mass at 200° C.)/(Mass before measurement)×100

<Heat Distortion Temperature>

The obtained chlorinated polyvinyl chloride resin composition was supplied to two 8-inch rolls, kneaded at 205° C. for three minutes, and formed into sheets each having a thickness of 1.0 mm. The obtained sheets were placed on top of each other, preheated with a press at 205° C. for three minutes, and then pressed for four minutes. This produced a pressed plate having a thickness of 3 mm. The obtained pressed plate was cut by machining to prepare a specimen. This specimen was used to measure the heat distortion temperature in conformity with ASTM D648 at a load of 186 N/cm$^2$. The heat distortion temperature was measured after the obtained pressed plate was annealed for 24 hours in a gear oven at 100° C.

<Flow Evaluation (Fluidity)>

Flow evaluation was performed using Shimadzu Flow Tester (CFT-500D/100D, available from Shimadzu Corporation). Specifically, a rolled sheet prepared in <Heat distortion temperature> was cut to an about 5-mm square piece, supplied to a barrel heated to 160° C., preheated for 10 minutes, and then extruded through a capillary with a die diameter of 1 mm and a die length of 10 mm at a load of 205 kgf. The measurement was started when 3 mm of molten resin was discharged from the capillary. The number of seconds it took per mm was measured.

[Evaluation of Molded Body]

<Surface Roughness (Molded Body Appearance)>

The surface roughness (Sa) was measured using a surface roughness tester (available from Tokyo Seimitsu Co., Ltd., SURFCOM 480A) by a method in conformity with JIS B 0601. The measurement conditions were as follows: evaluation length: 0.3 mm; measurement speed: 0.3 mm/sec; and cut-off: 0.08 mm.

<Cross-Sectional Observation of Molded Body>

The obtained solid, rectangular plate-shaped molded body was cut with a saw for vinyl chloride, and the cross section was smoothed with sandpaper. The state of the cross section was then visually observed to evaluate the presence or absence of bubbles (foaming).

<Processability after Molding (Cutting Test with Diamond Cutter)>

The obtained solid, rectangular plate-shaped molded body was left to stand in a freezer at −10° C. for 24 hours and cut with a diamond cutter. The molded body was then visually observed for the presence or absence of chips or cracks.

TABLE 1

| | | | | Example | | | | | | | | | |
|---|---|---|---|---|---|---|---|---|---|---|---|---|---|
| | | | | 1 | 2 | 3 | 4 | 5 | 6 | 7 | 8 | 9 | 10 |
| Composition (parts by mass) | CPVC | Amount of added chlorine | % by mass | 10.2 | 10.2 | 13.3 | 10.4 | 10.2 | 10.2 | 10.2 | 6.1 | 8.1 | 10.3 |
| | | Degree of polymerization | | 1000 | 1000 | 1000 | 1000 | 1000 | 1000 | 1000 | 1000 | 1000 | 700 |
| | | Molecular structure (% by mass) | $—CCl_2—$ | 10.1 | 10.1 | 31.8 | 13.8 | 10.1 | 10.1 | 10.1 | 5.6 | 3.4 | 10.2 |
| | | | —CHCl— | 65.2 | 65.2 | 29.3 | 58.4 | 65.2 | 65.2 | 65.2 | 61.9 | 72.8 | 65.3 |
| | | | Others | 24.7 | 24.7 | 38.9 | 27.8 | 24.7 | 24.7 | 24.7 | 32.5 | 23.8 | 24.5 |
| | | Addition amount (parts by weight) | | 100 | 100 | 100 | 100 | 100 | 100 | 100 | 100 | 100 | 100 |
| | CPE | Chlorinated polyethylene (CPE) | | 10 | 10 | 10 | 10 | 15 | 10 | 10 | 11 | 10 | 10 |
| | Thermal stabilizer | Primary stabilizer (dibutyltin mercaptide) | | 1.5 | 1.5 | 1.5 | 2.5 | 1.5 | 1.5 | 1.0 | 1.5 | 1.5 | 1.5 |
| | | Co-stabilizer (sodium adipate) | | 1.6 | 2.8 | 1.6 | 1.6 | 1.6 | 6.2 | 0.5 | 1.6 | 1.6 | 1.6 |
| | | Co-stabilizer (zeolite) | | 0 | 0 | 0 | 0 | 0 | 0 | 0 | 0 | 0 | 0 |
| | Additive | Polyethylene lubricant | | 1 | 1 | 1 | 1 | 1 | 1 | 1 | 1 | 1 | 1 |
| | | Ester lubricant | | 0.5 | 0.5 | 0.5 | 0.5 | 0.5 | 0.5 | 0.5 | 0.5 | 0.5 | 0.5 |
| CPE/thermal stabilizer | | | | 3.2 | 2.3 | 3.2 | 2.4 | 4.8 | 1.3 | 6.7 | 3.5 | 3.2 | 3.2 |
| Total amount of CPE + ($—CCl_2—$) (% by mass) | | | | 18.8 | 18.7 | 40.5 | 22.5 | 22.6 | 18.5 | 18.9 | 15.1 | 12.1 | 18.9 |
| —CHCl— content (% by mass) in total amount of (CPE + CPVC) | | | | 68.6 | 68.6 | 32.7 | 61.8 | 68.6 | 68.6 | 68.6 | 65.3 | 76.2 | 68.7 |
| Co-stabilizer/primary stabilizer | | | | 1.1 | 1.9 | 1.1 | 0.6 | 1.1 | 4.1 | 0.5 | 1.1 | 1.1 | 1.1 |
| Evaluation (resin composition) | Volatility (loss on heating 200° C.) | | % by mass | 1.1 | 1.2 | 1.2 | 2.8 | 1.7 | 1.7 | 0.9 | 1.0 | 0.9 | 1.1 |
| | Fluidity (flow tester 160° C.) | | $mm^3/sec$ | 40 | 43 | 28 | 48 | 53 | 51 | 24 | 57 | 50 | 54 |
| | Heat distortion temperature (HDT) | | ° C. | 106 | 104 | 121 | 103 | 100 | 106 | 108 | 101 | 104 | 109 |

TABLE 1-continued

| | | | | | | | | | | | | |
|---|---|---|---|---|---|---|---|---|---|---|---|---|
| Evaluation (molded body) | Molded body appearance (surface roughness meter Sa) | µm | 19 | 21 | 26 | 18 | 12 | 27 | 26 | 11 | 13 | 11 |
| | Molded body cross section (visual observation, presence or absence of void) | | None | None | None | None | None | None | None | None | None | None |
| | Cutting test with diamond cutter (presence or absence of chip) | | None | None | None | None | None | None | None | None | None | None |

| | | | | Example | Comparative Example | | | | | | | |
|---|---|---|---|---|---|---|---|---|---|---|---|---|
| | | | | 11 | 1 | 2 | 3 | 4 | 5 | 6 | 7 | 8 |
| Composition (parts by mass) | CPVC | Amount of added chlorine | % by mass | 10.1 | 10.2 | 10.2 | 10.2 | 10.2 | 10.2 | 13.8 | 4.7 | 10.2 |
| | | Degree of polymerization | | 1300 | 1000 | 1000 | 1000 | 1000 | 1000 | 1000 | 1000 | 1000 |
| | | Molecular structure (% by mass) | —$CCl_2$— | 10.1 | 10.1 | 10.1 | 10.1 | 10.1 | 10.1 | 37.3 | 2.7 | 10.1 |
| | | | —CHCl— | 65.0 | 65.2 | 65.2 | 65.2 | 65.2 | 65.2 | 19.7 | 63.1 | 65.2 |
| | | | Others | 24.9 | 24.7 | 24.7 | 24.7 | 24.7 | 24.7 | 43.1 | 34.2 | 24.7 |
| | | Addition amount (parts by weight) | | 100 | 100 | 100 | 100 | 100 | 100 | 100 | 100 | 100 |
| | CPE | Chlorinated polyethylene (CPE) | | 10 | 5 | 10 | 9 | 10 | 10 | 10 | 10 | 10 |
| | Thermal stabilizer | Primary stabilizer (dibutyltin mercaptide) | | 1.5 | 1.5 | 1.5 | 0.9 | 1.5 | 1.5 | 1.5 | 1.5 | 3 |
| | | Co-stabilizer (sodium adipate) | | 1.6 | 5 | 11 | 0.3 | 0 | 0 | 1.6 | 1.6 | 1 |
| | | Co-stabilizer (zeolite) | | 0 | 0 | 0 | 0 | 2.8 | 2 | 0 | 0 | 0 |
| | Additive | Polyethylene lubricant | | 1 | 1 | 1 | 1 | 1 | 1 | 1 | 1 | 1 |
| | | Ester lubricant | | 0.5 | 0.5 | 0.5 | 0.5 | 0.5 | 0.5 | 0.5 | 0.5 | 0.5 |
| CPE/thermal stabilizer | | | | 3.2 | 0.8 | 0.8 | 7.5 | 2.3 | 2.9 | 3.2 | 3.2 | 2.5 |
| Total amount of CPE + (—$CCl_2$—) (% by mass) | | | | 18.8 | 14.5 | 18.2 | 18.2 | 18.7 | 18.8 | 46.0 | 11.4 | 18.8 |
| —CHCl— content (% by mass) in total amount of (CPE + CPVC) | | | | 68.4 | 68.6 | 68.6 | 68.6 | 68.6 | 68.6 | 23.1 | 66.5 | 68.6 |
| Co-stabilizer/primary stabilizer | | | | 1.1 | 3.3 | 7.3 | 0.3 | 1.9 | 1.3 | 1.1 | 1.1 | 0.3 |
| Evaluation (resin composition) | Volatility (loss on heating 200° C.) | | % by mass | 1.1 | 1.2 | 1.2 | 0.8 | 3.8 | 3.1 | 3.3 | 1.1 | 3.2 |
| | Fluidity (flow tester 160° C.) | | $mm^3$/sec | 26 | 13 | 17 | 22 | 41 | 40 | 7 | 62 | 28 |
| | Heat distortion temperature (HDT) | | ° C. | 108 | 110 | 110 | 109 | 103 | 104 | 123 | 92 | 97 |
| Evaluation (molded body) | Molded body appearance (surface roughness meter Sa) | | µm | 28 | 33 | 46 | 30 | 32 | 36 | 56 | 10 | 25 |
| | Molded body cross section (visual observation, presence or absence of void) | | | None | None | None | Present | Present | Present | Present | None | Present |
| | Cutting test with diamond cutter (presence or absence of chip) | | | None | Chip | Chip | None | Chip | Chip | Chip | None | Chip |

INDUSTRIAL APPLICABILITY

The present invention can provide a chlorinated polyvinyl chloride resin composition that is excellent in low-volatility in molding, processability after molding, thermal stability, and heat resistance and that enables the production of a molded body with high surface smoothness, and can also provide a chlorinated polyvinyl chloride resin molded body.

The invention claimed is:

1. A chlorinated polyvinyl chloride resin composition comprising:

a chlorinated polyvinyl chloride resin;

chlorinated polyethylene; and a thermal stabilizer, the chlorinated polyvinyl chloride resin containing a vinylidene unit in an amount of 3 to 32% by mass, the chlorinated polyvinyl chloride resin composition having a mass ratio of the chlorinated polyethylene to the thermal stabilizer (chlorinated polyethylene/thermal stabilizer) of 1.6 to 6.5, the chlorinated polyvinyl chloride resin composition having a loss on heating at 200° C. of less than 3% by mass.

2. A chlorinated polyvinyl chloride resin molded body comprising the chlorinated polyvinyl chloride resin composition according to claim 1.

* * * * *